United States Patent
Greene

(10) Patent No.: US 8,407,678 B2
(45) Date of Patent: Mar. 26, 2013

(54) METHOD OF ARRAY INTERCEPTION USING DATA-FLOW ANALYSIS

(75) Inventor: Jason Thomas Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 1244 days.

(21) Appl. No.: 12/199,713

(22) Filed: Aug. 27, 2008

(65) Prior Publication Data

US 2010/0058299 A1    Mar. 4, 2010

(51) Int. Cl.
*G06F 9/44* (2006.01)
(52) U.S. Cl. ......... 717/134; 717/110; 717/135; 717/138
(58) Field of Classification Search ............ 717/134, 717/135, 138, 110
See application file for complete search history.

(56) References Cited

U.S. PATENT DOCUMENTS

| | | | | |
|---|---|---|---|---|
| 6,339,782 B1* | 1/2002 | Gerard et al. | ............ | 718/1 |
| 6,792,606 B2* | 9/2004 | Halter et al. | ............ | 719/315 |
| 7,797,691 B2* | 9/2010 | Cockx et al. | ............ | 717/155 |
| 7,840,612 B2* | 11/2010 | Carmody et al. | ............ | 707/816 |
| 7,930,689 B2* | 4/2011 | Cabillic et al. | ............ | 717/162 |
| 2003/0163596 A1* | 8/2003 | Halter et al. | ............ | 709/315 |
| 2008/0098054 A1* | 4/2008 | Carmody et al. | ............ | 707/206 |

OTHER PUBLICATIONS

Factor et al., "JavaSplit: A Runtime for Execution of Monolithic Java Programs on Heterogeneous Collections of Commodity", Dec. 2003.*
Wimmer et al., "Automatic Array Inlining in Java Virtual Machines", Apr. 2008.*
The Java Virtual Machine Specification, Copyright 1999, Sun Microsystems, Inc. Chapter 4, The Class File Format, 22 pages.
Terracotta Versus JBossCache, 2007 Teracotta Inc., 14 pages.

* cited by examiner

*Primary Examiner* — Phillip H Nguyen
(74) *Attorney, Agent, or Firm* — Lowenstein Sandler LLP

(57) ABSTRACT

An apparatus and a method for Java array interception using bytecode manipulation and data flow analysis. In one embodiment, a user-provided object class is identified. An array access operation of the user-provided object class is intercepted. The intercepted array access operation is translated with an emulator class of a native Java array. The translated array access operation is sent to an emulator class to determine whether to dispatch to the native Java array or an alternate data source.

21 Claims, 4 Drawing Sheets

METHOD OF ARRAY INTERCEPTION USING DATA-FLOW ANALYSIS

TECHNICAL FIELD

Embodiments of the present invention relate to computing systems, and more particularly, to Java arrays.

BACKGROUND

The ability to intercept read and write operations on java arrays is needed so that the behavior could be substituted with cluster/cache related logic. In other words, the ability to transparently map a Java array in Plain Old Java Object (POJO) Cache to a transactional, in-memory, replicated data cluster is needed. However, the root concept can be used for many other applications that wish to redefine the behavior of a java array.

The challenge in redefining the behavior of a java array is that it requires rewriting the java bytecode and replacing it with other instructions that still maintain the type-safety requirements of the Java Virtual Machine (JVM). Otherwise, the bytecode verifier will throw out the manipulated bytecode. This is a problem when replacing read operations on Object arrays since the type information is effectively missing from the compiled bytecode.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for Java array interception using bytecode manipulation and data flow analysis. In one embodiment, a user-provided object class is identified. An array access operation of the user-provided object class is intercepted. The intercepted array access operation is translated with an emulator class of a native Java array. The translated array access operation is sent to an emulator class to determine whether to dispatch to the native Java array or an alternate data source.

Frameworks are often needed to simplify access to some kind of data source. The simplest API is one that the end-user (developer) provides themselves. Frameworks can do this by transparently mapping a user defined object to the data source using a variety of techniques, although there are practical limitations imposed by the execution environment of the Java language itself (JVM). One such limitation is native Java arrays, which can not be redefined using normal object oriented techniques. The approach described here solves this problem by redefining the bytecode of all user-defined classes which access the array to be intercepted. The bytecode is redefined to call a special array emulator class instead of the normal Java array, allowing for the array behavior to be completely redefined.

Figure 1:
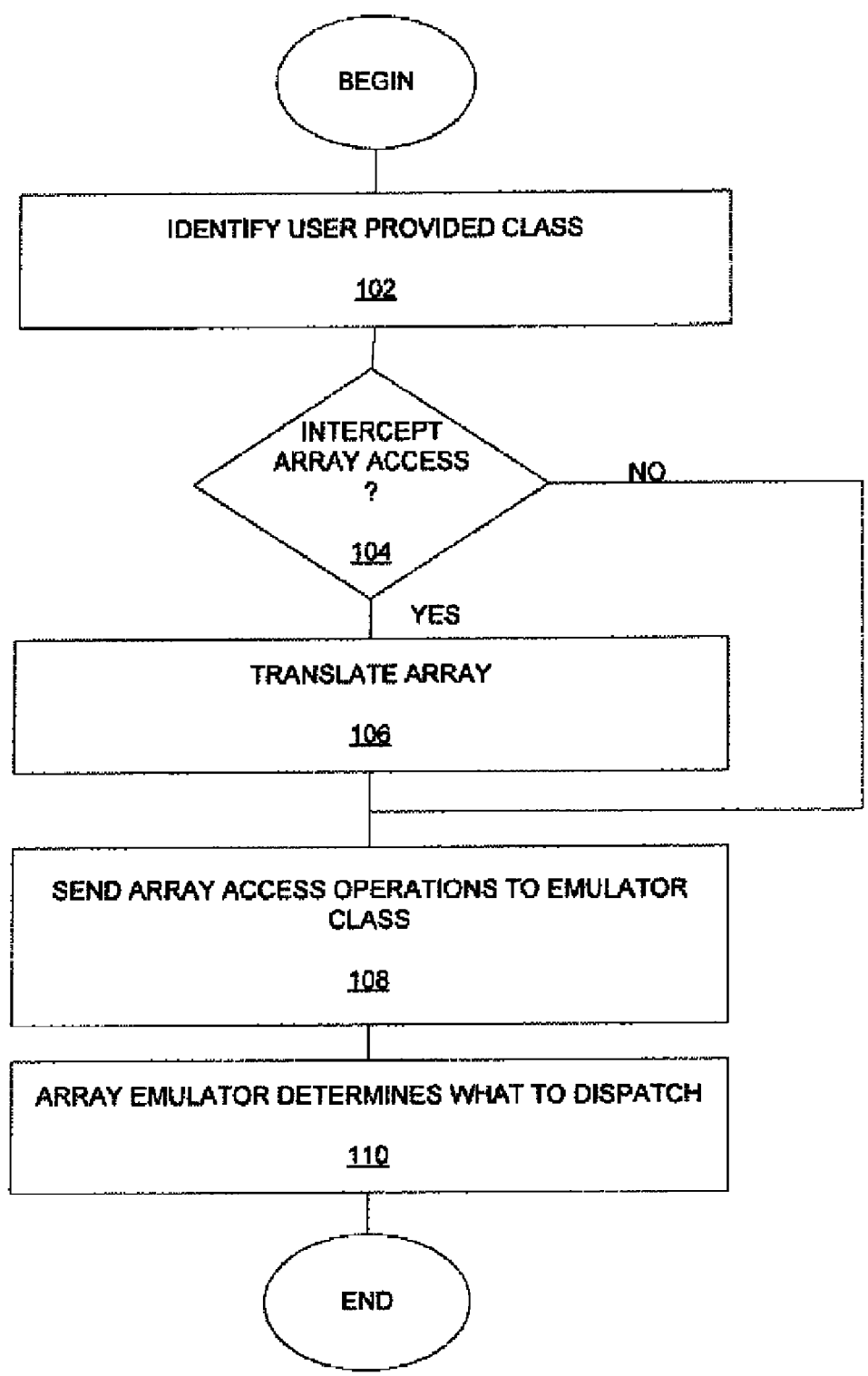
FIG. 1 is a flow diagram illustrating one embodiment of a method for intercepting and translating an array.

FIG. 1 is a flow diagram illustrating one embodiment of a method for intercepting and translating an array. The user-provided class is transformed either when it is initially loaded, or using an offline transformation tool. At 102, the user-provided class is identified. At 104, the transformation process determines whether the class accesses an array that should be intercepted. At 106, the instructions are then located and modified according to the translation process described in the following sections (see FIG. 2). At 108, once the transformation is performed array access operations performed by the user provided class are sent to an emulator class. At 110, when an array invocation occurs, the emulator class determines whether or not to dispatch to the original array, or some alternative data source (database, clustered cache, filesystem, etc). (See FIG. 3).

Figure 2:
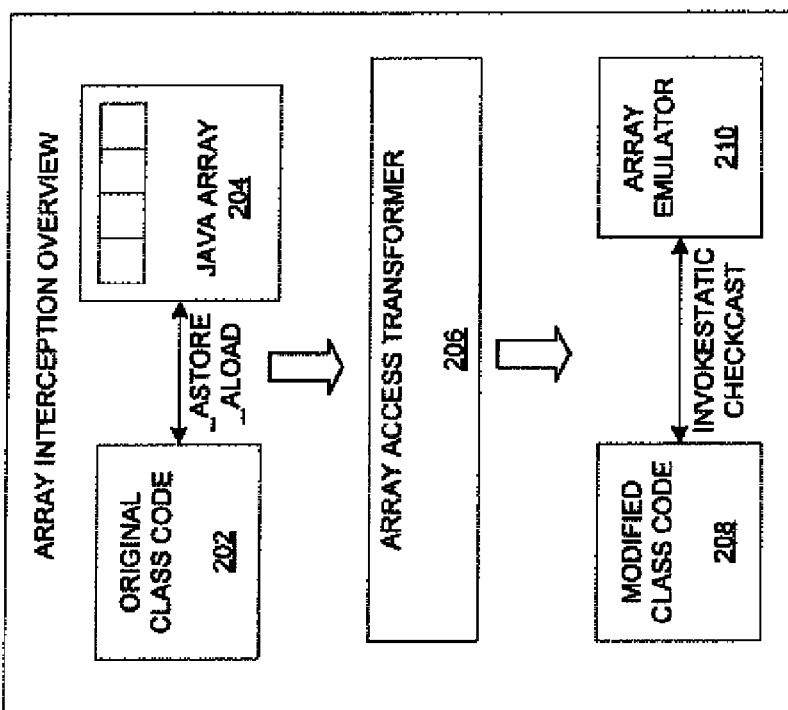
FIG. 2 is a block diagram illustrating one embodiment of an array interception.

FIG. 2 is a block diagram illustrating one embodiment of an array interception. The original class code 202 stores or loads into Java array 204. The JVM defines the following instructions for manipulating arrays: baload, caload, saload, iaload, laload, faload, daload, aaload, bastore, castore, sastore, iastore, lastore, fastore, dastore, aastore.

An array access transformer 206 replaces all primitive array read and write instructions with an invokestatic instruction that invokes a method with a signature matching the type of the array operation. A modified class code 208 is correlated with an Array emulator 210. For example, the signature of method replacing a iaload instruction would look like: public static int arrayReadInt(Object array, int index). While the signature of method replacing an iastore instruction would look like: public static void arrayWriteInt(Object array, int index, int element)

Any class implementing such a method can then redefine the behavior of the array operation. Object array instructions are replaced in the same manner, using java.lang.Object as the element type using array transformer 206. A special case applies to the aaload instruction. Once the aaload instruction has been replaced by an invokestatic instruction, this call must be immediately succeeded by a checkcast instruction, which indicates the correct type of the array element.

In one embodiment, the following store instructions are translated:

BASTORE (binary array store)—the BASTORE instruction is replaced with an INVOKESTATIC instruction using a method reference on the emulator class with the signature "(Ljava/lang/Object;IB)V", which matches the values on the stack before BASTORE is executed. Due to the larger instruction size, all instruction offsets, including those on the exception table are adjusted.

SASTORE (short array store)—the SASTORE instruction is replaced with an INVOKESTATIC instruction using a method reference on the emulator class with the signature "(Ljava/lang/Object;IS)V", which matches the values on the stack before SASTORE is executed. Due to the larger instruction size, all instruction offsets, including those on the exception table are adjusted.

IASTORE (integer array store)—the IASTORE instruction is replaced with an INVOKESTATIC instruction using a method reference on the emulator class with the signature "(Ljava/lang/Object;II)V", which matches the values on the stack before IASTORE is executed. Due to the larger instruction size, all instruction offsets, including those on the exception table are adjusted.

LASTORE (long array store)—the LASTORE instruction is replaced with an INVOKESTATIC instruction using a method reference on the emulator class with the signature "(Ljava/lang/Object;IJ)V", which matches the values on the stack before LASTORE is executed. Due to the larger instruction size, all instruction offsets, including those on the exception table are adjusted.

FASTORE (float array store)—the FASTORE instruction is replaced with an INVOKESTATIC instruction using a method reference on the emulator class with the signature "(Ljava/lang/Object;IF)V", which matches the values on the stack before FASTORE is executed. Due to the larger instruction size, all instruction offsets, including those on the exception table are adjusted.

DASTORE (double array store)—the DASTORE instruction is replaced with an INVOKESTATIC instruction using a method reference on the emulator class with the signature "(Ljava/lang/Object;ID)V", which matches the values on the stack before DASTORE is executed. Due to the larger instruction size, all instruction offsets, including those on the exception table are adjusted.

CASTORE (character array store)—the CASTORE instruction is replaced with an INVOKESTATIC instruction using a method reference on the emulator class with the signature "(Ljava/lang/Object;IC)", which matches the values on the stack before CASTORE is executed. Due to the larger instruction size, all instruction offsets, including those on the exception table are adjusted.

AASTORE (object array store)—the AASTORE instruction is replaced with an IVOKESTATIC instruction using a method reference on the emulator class with the signature "(Ljava/lang/Object;ILjava/lang/Object;)V", which matches the values on the stack before AASTORE is executed. Due to the larger instruction size, all instruction offsets, including those on the exception table are adjusted.

The following are example of Translation of Array Load Instructions:

BALOAD (binary array load)—the BALOAD instruction is replaced with an INVOKESTATIC instruction using a method reference on the emulator class with the signature "(Ljava/lang/Object;I)B", which matches the values on the stack before BALOAD is executed. Due to the larger instruction size, all instruction offsets, including those on the exception table are adjusted.

SALOAD (short array load)—the SALOAD instruction is replaced with an INVOKESTATIC instruction using a method reference on the emulator class with the signature "(Ljava/lang/Object;I)S", which matches the values on the stack before SALOAD is executed. Due to the larger instruction size, all instruction offsets, including those on the exception table are adjusted.

IALOAD (integer array load)—the IALOAD instruction is replaced with an INVOKESTATIC instruction using a method reference on the emulator class with the signature "(Ljava/lang/Object;I)I", which matches the values on the stack before IALOAD is executed. Due to the larger instruction size, all instruction offsets, including those on the exception table are adjusted.

LALOAD (long array load)—the LALOAD instruction is replaced with an INVOKESTATIC instruction using a method reference on the emulator class with the signature "(Ljava/lang/Object;J)J", which matches the values on the stack before LALOAD is executed. Due to the larger instruction size, all instruction offsets, including those on the exception table are adjusted.

FALOAD (float array load)—the FALOAD instruction is replaced with an INVOKESTATIC instruction using a method reference on the emulator class with the signature "(Ljava/lang/Object;I)F", which matches the values on the stack before FALOAD is executed. Due to the larger instruction size, all instruction offsets, including those on the exception table are adjusted.

DALOAD (double array load)—the DALOAD instruction is replaced with an INVOKESTATIC instruction using a method reference on the emulator class with the signature "(Ljava/lang/Object;I)D", which matches the values on the stack before DALOAD is executed. Due to the larger instruction size, all instruction offsets, including those on the exception table are adjusted.

CALOAD (character array load)—the CALOAD instruction is replaced with an INVOKESTATIC instruction using a method reference on the emulator class with the signature "(Ljava/lang/Object;I)C", which matches the values on the stack before CALOAD is executed. Due to the larger instruction size, all instruction offsets, including those on the exception table are adjusted.

AALOAD (object array load)—rhe AALOAD instruction is replaced with an INVOKESTATIC instruction using a method reference on the emulator class with the signature "(Ljava/lang/Object;I)Ljava/lang/Object;", which matches the values on the stack before AALOAD is executed. A CHECKCAST instruction is inserted immediately following the AALOAD instruction. The value of the CHECKCAST is determined using a specialized data-flow analysis procedure described in FIG. 4 (Data-Flow Proceedure Analysis For AALOAD). All instruction offsets, including those on the exception table are adjusted to handle the inserted gap.

Figure 3:
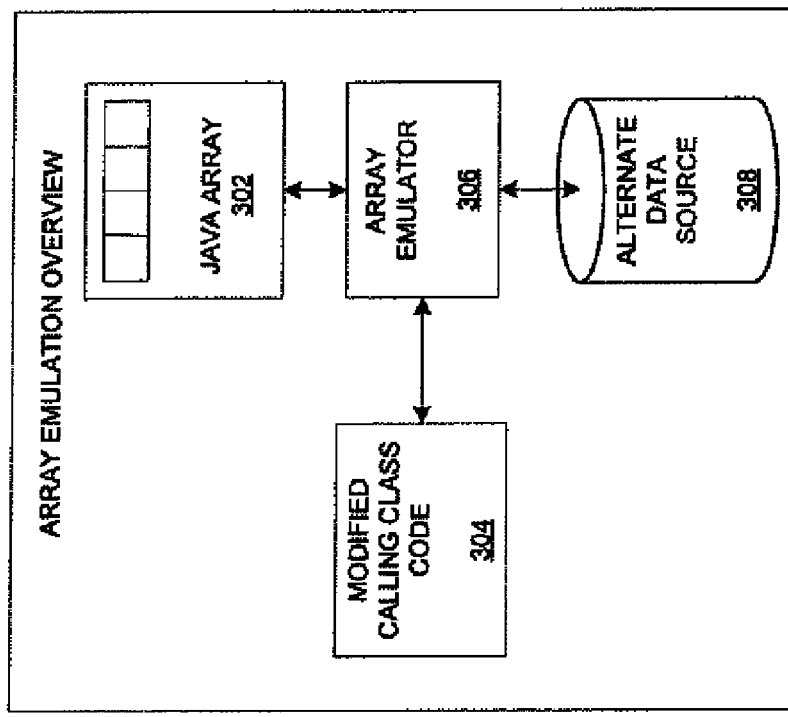
FIG. 3 is a flow diagram illustrating one embodiment of an array emulation overview.

Since the type of the array element is effectively lost from the compiler generated bytecode, it is reconstructed using a data-flow analysis using the array emulator illustrated in FIG. 3. The array emulator 306 determines whether the modified calling class code 304 is to access Java array 302 or an alternate data source 308 (database, clustered cache, filesystem, etc. . . . ).

The JVM bytecode verification process performs analysis of its own to verify the legality of the supplied bytecode, however it skips processing of certain type information since it can be verified at runtime during execution of the code. The data-flow analyzer used in this array load replacement process must determine the most-accurate known type of the array element, such that both the JVM analysis and runtime verification phases both pass with bytecode generated from this process.

Analysis proceeds by modeling the effects on the start stack state and local variable table of every instruction in the method containing the aaload instruction to be replaced. This begins with the first instruction, whose start state is based off the method signature. Each instruction is processed using the following procedure:

The resulting type state of the stack and local variable table are determined by interpreting the outcome of the current instruction. If a stack position or local variable at the start of the instruction has multiple possible types, the possible type set is attempted to be reduced by eliminating types from the set which are not legal according to the instruction. The potentially reduced type set is then recorded in the post-instruction state, as well as all previous instructions which used this type. All stack positions and local variables that have known types are simply executed according to the rules of the instruction, and the resulting types are placed in the post instruction set.

This post-instruction state is then merged into all possible successor instructions. The successor instructions are determined by the instruction type and the values of the exception table. The merge operation attempts to find a common type for every type in the current instructions stack and local variable table. The common type for a primitive is the primitive itself. The common type of an object is the set of all common interfaces and superclasses. The common type of a type set and another type (or set) is the intersection. If there is no common type, then the entry is marked as unusable. If a successor instruction's type state was changed to values different from those before this merge, it is then marked to be processed again. This process repeats where the next marked instruction becomes the current instruction. Eventually merges will result in no changes, and the process will end. Any resulting type sets that could not be reduced are treated as java.lang.Object.

Once this analysis process is complete the type following the aaload instruction is known, and is used to produce a checkcast instruction succeeding the invokestatic.

Figure 4:
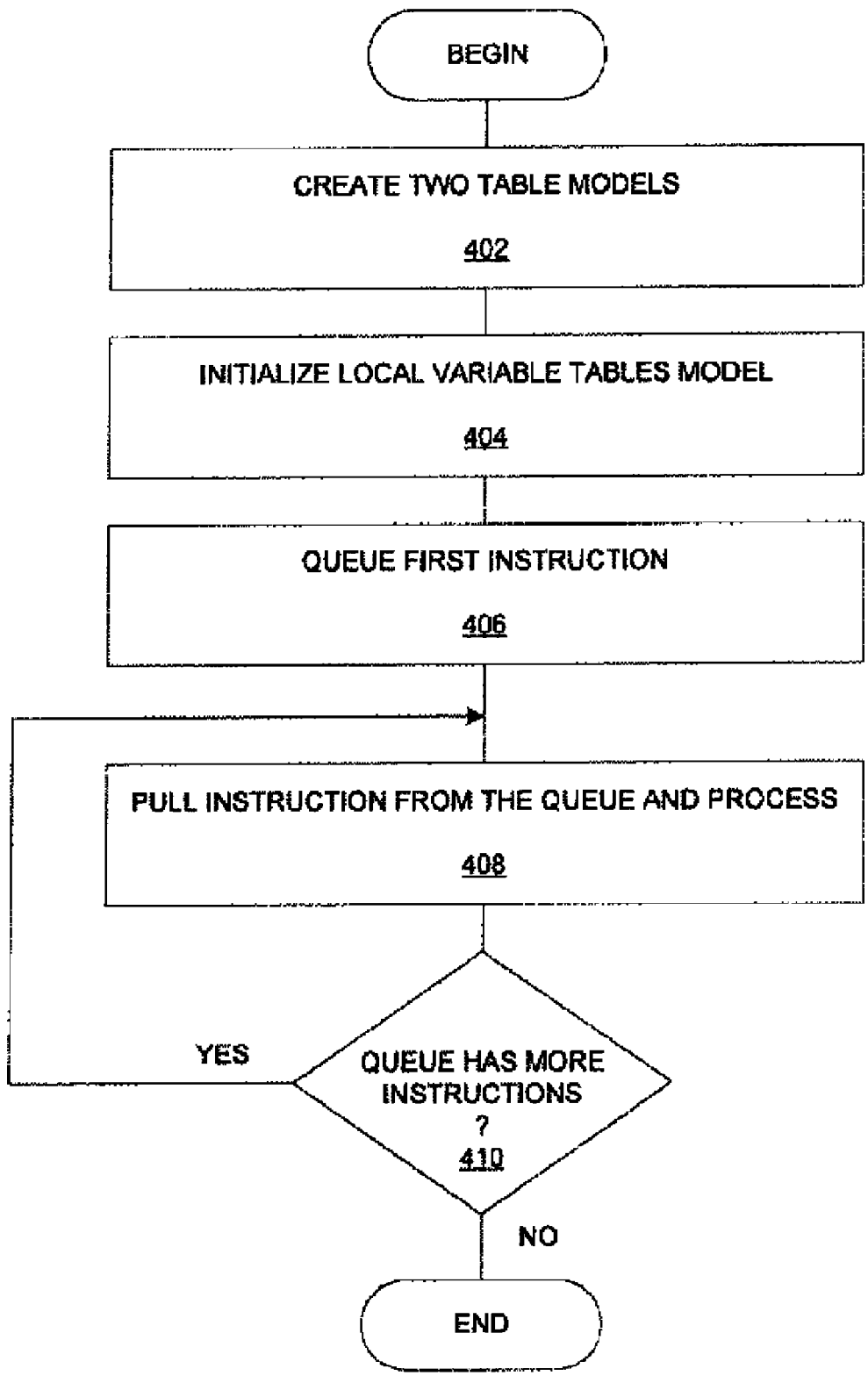
FIG. 4 is a flow diagram illustrating one embodiment of a method for a data flow analysis.

FIG. 4 is a flow diagram illustrating one embodiment of a method for a data flow procedure for AALOAD. At 402, two logical tables are created to model the type state of the local variable table and the stack frame at the start of every instruction. These tables are therefore indexed by the instruction offset. At 404, the local variable table model is initialized for the first instruction using the type information in the method signature. At 406, the first instruction of the method is queued for processing. At 408, an instruction is pulled from the queue, and processed.

In one embodiment, the process starts by retrieving the start state using the instruction as the index into the stack frame and local variable tables. The effects of the instructions are modeled on the start state. If a type is consumed from either table it is verified. During verification, if the type represents a set of more than one possible types, that set is reduced to only the types that are legal according to the instruction. In addition, all previous references to this type set are updated to reflect the intersection. The resulting type state of the local variable table and the stack frame is then merged into all successor instructions.

Successor instructions include all jump targets, the following instruction if control-flow allows, and the values in the exception table. Each type in the post-instruction type state is merged with every type in the successor instruction type state. The resulting type in each case is the nearest common super type. If there are multiple common super types, the resulting type becomes a set of all possible types. If either of types are sets of multiple types, then the resulting type is the intersection. In addition, all previous references to this type set are updated to reflect the intersection.

Each successor instruction that resulted in a different type state after the merge is queued for reprocessing.

At 410, if the queue still contains instructions to process, repeat this process starting at 408. After this has completed, the type of the array reference that is passed to every AALOAD instruction can be determined by using the instruction offset as an index into the stack frame table, and retrieving the type stored on the top of the stack.

Figure 5:
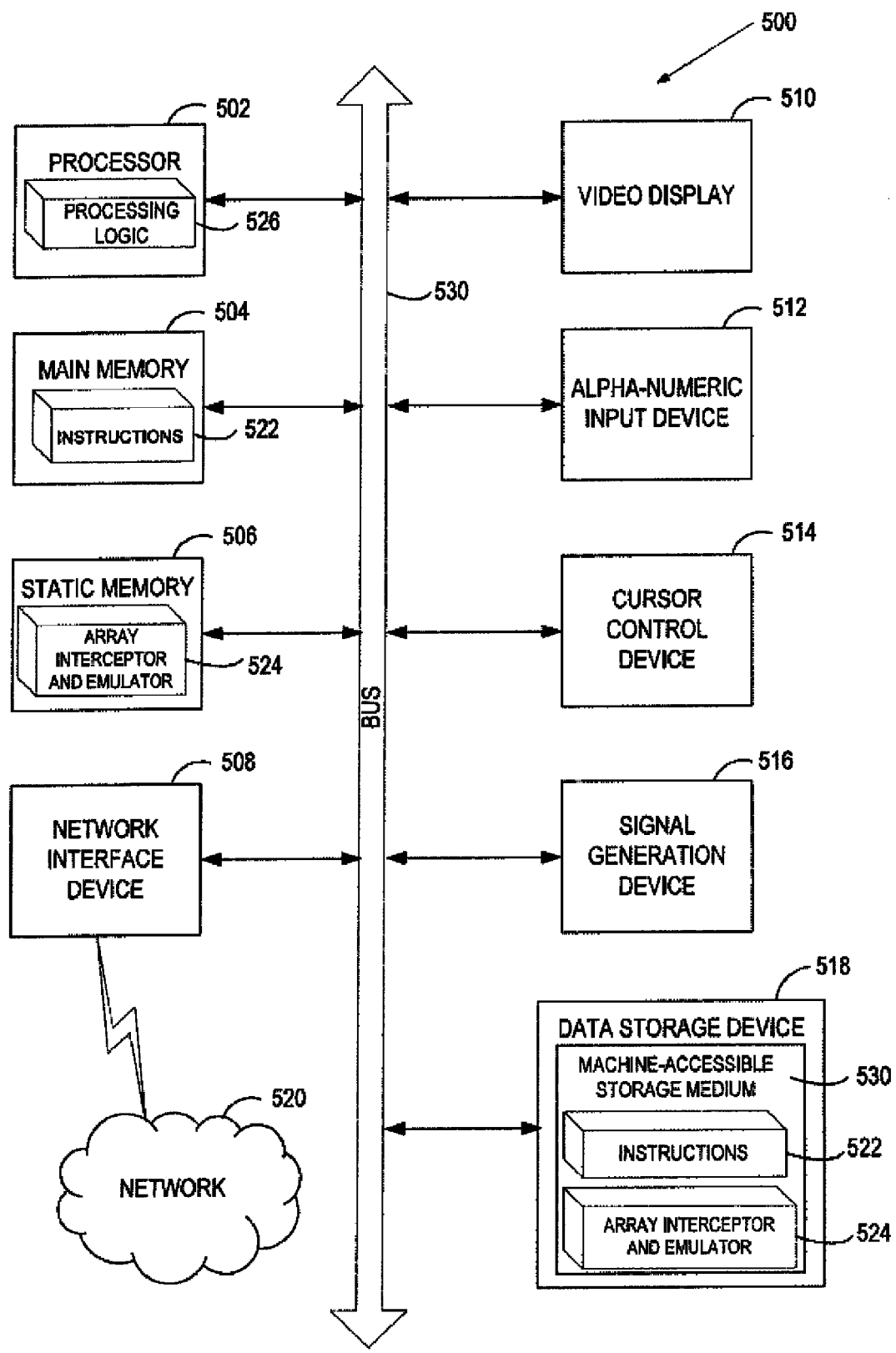
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the array interceptor and emulator 524 as presently described. The array interceptor and emulator 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying a user-provided object class;
   intercepting an array access operation of the user-provided object class;
   replacing, by an array access transformer, the array access operation with an instruction with a signature matching the type of the array access operation of a native Java array, the instruction to invoke an emulator class; and
   invoking the emulator class by the replaced instruction to determine whether to dispatch to the native Java array or an alternate data source.

2. The method of claim 1 further comprising
   determining whether the array access operation of the user-provided object class accesses an array to be intercepted.

3. The method of claim 1 further comprising:
   locating an instruction associated with the array access operation; and
   modifying the instruction with an array access transformer.

4. The method of claim 1, wherein the replacing further comprises:
   creating a local variable table and a stack frame table indexed by instruction offsets;
   initializing the local variable table for a first instruction;
   queuing the first instruction for processing; and
   pulling and processing an instruction from the queue until the queue is empty.

5. A method comprising:
   identifying a user-provided object class;
   intercepting an array access operation of the user-provided object class;
   translating the array access operation with an instruction to invoke an emulator class of a native Java array; and
   sending the translated array access operation to the emulator class, the emulator class determining whether to dispatch to the native Java array or an alternate data source, wherein the translating further comprises:
   creating a local variable table and a stack frame table indexed by instruction offsets;
   initializing the local variable table for a first instruction;
   queuing the first instruction for processing; and
   pulling and processing an instruction from the queue until the queue is empty.

6. The method of claim 5 further comprising:
   determining the type of array reference by using the instruction offsets as an index into the stack frame table; and
   retrieving the type of array reference stored on the top of the stack frame table.

7. The method of claim 5 wherein processing the instruction further comprises:
   retrieving a start state using the instruction offsets as the index into the stack frame and local variable tables;
   modeling the effects of the instructions on the start state;
   merging the resulting type state of the local variable table and the stack frame table into all successor instructions; and
   queuing the each successor instruction that resulted in a different type state after the merge for reprocessing.

8. The method of claim 7 wherein merging further comprises
   merging each type in the post-instruction type state with every type in the successor instruction type state.

9. A server comprising:
   a memory; and a processor coupled to the memory, the processor comprising:
an array transformer configured to identify a user-provided object class and to intercept an array access operation of the user-provided object class; and
an array emulator coupled to the array transformer, the array emulator configured to translate the array access operation to a native Java array, and to determine whether to dispatch the translated array access operation to the native Java array or an alternate data source, wherein the array transformer is configured to create a local variable table and a stack frame table indexed by instruction offsets, to initialize the local variable table for a first instruction, to queue the first instruction for processing, and to pull and process an instruction from the queue until the queue is empty.

10. The server of claim 9 wherein the array transformer is configured to determine whether the array access operation of the user-provided object class accesses an array to be intercepted.

11. The server of claim 9 wherein the array transformer is configured to locate and modify an instruction associated with the array access operation.

12. The server of claim 9 wherein the array transformer is configured to determine the type of array reference by using the instruction offsets as an index into the stack frame table, and to retrieve the type of array reference stored on the top of the stack frame table.

13. The server of claim 9 wherein the array transformer is configured to retrieve a start state using the instruction offsets as the index into the stack frame and local variable tables, to model the effects of the instructions on the start state, to merge the resulting type state of the local variable table and the stack frame table into all successor instructions, and to queue the each successor instruction that resulted in a different type state after the merge for reprocessing.

14. The server of claim 13 wherein the array transformer is configured to merge each type in the post-instruction type state with every type in the successor instruction type state.

15. A non-transitory computer-accessible storage medium including data that, when accessed by a computer, cause the computer to perform a method comprising:
identifying a user-provided object class;
intercepting an array access operation of the user-provided object class;
replacing, by an array access transformer, the array access operation with an instruction with a signature matching the type of the array access operation of a native Java array, the instruction to invoke an emulator class; and
invoking the emulator class by the replaced instruction to determine whether to dispatch to the native Java array or an alternate data source.

16. The computer-accessible storage medium of claim 15 wherein the method further comprises
determining whether the array access operation of the user-provided object class accesses an array to be intercepted.

17. The computer-accessible storage medium of claim 15 wherein the method further comprises locating an instruction associated with the array access operation; and modifying the instruction with an array access transformer.

18. The computer-accessible storage medium of claim 15, wherein the replacing further comprises:
creating a local variable table and a stack frame table indexed by instruction offsets;
initializing the local variable table for a first instruction;
queuing the first instruction for processing; and
pulling and processing an instruction from the queue until the queue is empty.

19. A non-transitory computer-accessible storage medium including data that, when accessed by a computer, cause the computer to perform a method comprising:
identifying a user-provided object class;
intercepting an array access operation of the user-provided object class;
translating the array access operation with an instruction to invoke an emulator class of a native Java array; and
sending the translated array access operation to the emulator class, the emulator class determining whether to dispatch to the native Java array or an alternate data source, wherein the translating further comprises:
creating a local variable table and a stack frame table indexed by instruction offsets;
initializing the local variable table for a first instruction;
queuing the first instruction for processing; and
pulling and processing an instruction from the queue until the queue is empty.

20. The computer-accessible storage medium of claim 19 further comprising:
determining the type of array reference by using the instruction offsets as an index into the stack frame table;
retrieving the type of array reference stored on the top of the stack frame table.

21. The computer-accessible storage medium of claim 19 wherein processing the instruction further comprises:
retrieving a start state using the instruction offsets as the index into the stack frame and local variable tables;
modeling the effects of the instructions on the start state;
merging the resulting type state of the local variable table and the stack frame table into all successor instructions; and
queuing the each successor instruction that resulted in a different type state after the merge for reprocessing.

* * * * *